Nov. 22, 1927.  W. STEININGER  1,650,473
LAWN SPRINKLER
Filed Dec. 9, 1925   3 Sheets-Sheet 3

William Steininger, Inventor

Patented Nov. 22, 1927.

1,650,473

UNITED STATES PATENT OFFICE.

WILLIAM STEININGER, OF BERWYN, ILLINOIS.

LAWN SPRINKLER.

Application filed December 9, 1925. Serial No. 74,362.

This invention relates to certain new and useful improvements in sprinklers adapted for use in watering lawns, and has more particular reference to a lawn sprinkler of that type wherein a rotatable sprinkling head is provided having a sprinkling arm or nozzle, the discharge of water from which, by its re-action causes rotation of the head.

The primary object of the invention is to provide a lawn sprinkler of the above kind embodying a pair of oppositely acting re-action sprinkling arms or nozzles and simple and effective means for selectively rendering either desired sprinkling arm operable whereby the sprinkling head may be caused to rotate in either direction.

A further object of the invention is to provide means for automatically and alternately placing the oppositely acting sprinkler arms in operation so that the sprinkling head will be given an oscillatory rotary motion.

A still further object is to provide means for varying the range of oscillation of the sprinkling head, as desired.

A further object is to provide a lawn sprinkler of the above kind which is extremely simple and durable in construction as well as efficient in operation.

Still another object of the invention is to provide improved automatic valve mechanism for alternately placing the sprinkling arms in communication with the source of water supply whereby the oscillatory rotary motion of the sprinkling head is effected, the valve mechanism being constructed of a minimum number of durable parts which will not readily get out of order and which will therefore insure a long continued useful operation of the sprinkler.

Other objects will appear as the nature of the invention is better understood, and the same consists in the novel form, combination and arrangement of parts hereinafter more fully described, shown in the accompanying drawings and claimed.

In the accompanying drawings, wherein like reference characters indicate corresponding parts throughout the several views, Figure 1 is a side elevational view of a lawn sprinkler constructed in accordance with the present invention;

Figure 4 is an enlarged fragmentary vertical section illustrating details of the device shown in Figure 1, and particularly of the rotatable sprinkler head and valve mechanism;

Figure 5 is an enlarged detail end elevational view of a detail of the invention and illustrating the control valve and the ports controlled thereby;

Figure 6 is an enlarged fragmentary vertical section taken upon line 6—6 of Figure 1;

Figure 7 is a view similar to Figure 6 taken upon line 7—7 of Figure 2; and

Figure 1:
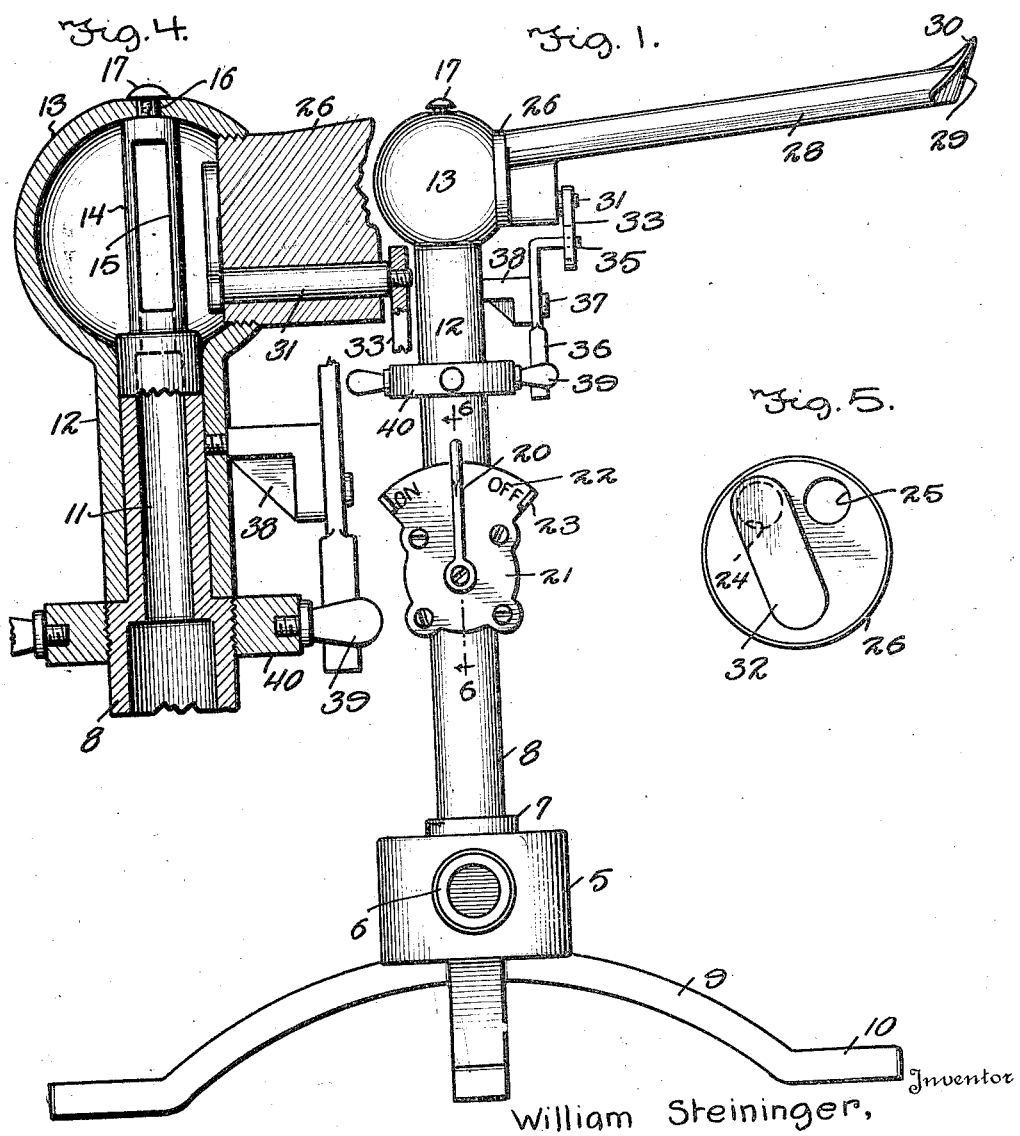

Referring more in detail to the drawings, the present invention includes a hollow base 5 which is provided with a side water inlet as at 6 adapted for connection with a water supply hose, and a top outlet 7 in which is fixed the lower end of a hollow upright or standard 8. The base 5 is preferably provided with downwardly diverging supporting legs 9 which terminate in horizontal feet 10 adapted to rest upon the ground.

The upper end of the standard 8 is reduced in diameter as shown at 11, and rotatably fitted upon this reduced portion 11 of the standard is the cylindrical lower portion of a sprinkling head 12 which embodies an enlarged upper end portion 13. The reduced upper end 11 of the standard 8 is provided with a further reduced extension 14 which is provided with relatively large longitudinally elongated opposed slots 15 in the sides thereof and within the enlarged upper end portion 13 of the sprinkler head so that the water may readily flow into the upper end of the sprinkler head from the standard. The extension 14 preferably terminates at its upper end in a cylindrical stud 16 which projects through a relatively small opening in the top of the sprinkler head 12 and which has a screw 17 threaded therein with its head in engagement with the top of the sprinkler head for maintaining the latter detachably upon the reduced end portion 11 of the standard 8. The head of the screw 17 does not bear tightly upon the sprinkler head, and the latter is therefore mounted so as to freely rotate about the end portion 11 of the standard although being incapable of accidental detachment from the latter. The larger lower end portion of the standard 8 is preferably provided intermediate its ends with an integral enlargement forming a valve casing 18 having a movable valve member 19 therein which is manually operable for controlling the flow of water upwardly through the standard or for preventing flow of water therethrough. The valve member 19 preferably consists in a turn plug having a lateral operating handle or lever 20 upon one end which cooperates with a suitable combined dial and cover plate 21 of the valve casing 18. The combined dial and cover plate 21 preferably has an extension on which are suitably placed the indications 22 adjacent which the handle or lever 20 is adapted to be selectively positioned for respectively indicating whether or not the valve is turned on or off. The sides of the extension of the plate 21 are preferably provided with suitable stop lugs 23 for limiting the swinging movement of the lever 20 to positions whereinthe valve member 19 is turned to on or off position.

The enlarged upper end portion 13 of the sprinkling head is provided with a pair of lateral water outlets or passages 24 and 25, and these passages are preferably provided in a block 26 which has one end threaded into a relatively large side opening in the end portion 13 of the sprinkler head. Secured to the outer end of the block 26 respectively in communication with the passages 24 and 25 are a pair of sprinkling arms or nozzles 27 and 28 which are in side by side relation. These sprinkling arms or nozzles may be either integrally formed or separate and in contiguous relation, as found most desirable, and they are of the well known re-action type but of oppositely acting character whereby the discharge of water from one arm, by its re-action, will cause rotation of the head 12 in one direction, while the discharge of water from the other arm, by its re-action, will cause rotation of the head 12 in the opposite direction. The sprinkling arms or nozzles 27 and 28 have suitable discharge ports 29 at their outer ends with which are associated suitable deflecting plates 30 by means of which the jets of water may be directed in the desired direction from said sprinkling arms or nozzles for securing a most effective sprinkling operation. The jet of water will flow in a direction laterally from one sprinkling arm opposite to the direction from which the jet will flow from the other sprinkling arm so that the oppositely acting effect of the nozzles is secured, as will be obvious to one skilled in the art.

Journaled longitudinally in the block 26 below the passages 24 and 25 of the latter and in a horizontal position is a rock shaft 31 upon the inner end of which within the upper end portion 13 of the sprinkling head is secured a valve plate 32. The lower end of the valve plate 32 is fixed to the shaft 31 so that the upper end portion of said valve plate may swing across the inner end face of the block 26 for alternately or selectively closing the desired one of the passages 24 and 25. In other words, the valve plate 32 may be positioned for closing either desired passage 24 or 25 for permitting the water to flow from the sprinkling head into and through either desired sprinkling arm and by swinging the valve plate 32 back and forth the passages may be alternately opened and closed for alternately placing the nozzles or sprinkling arms in communication with the sprinkling head.

The outer end of the shaft 31 projects beyond the outer end of the block 26 and has a lever or arm 33 fixed thereon, and the free end portion of this lever or arm 33 is formed with a longitudinally elongated slot 34 in which is freely movable a pin 35 rigid with and projecting laterally from the upper end of a lever 36 that is hinged intermediate its ends as at 37 to a bracket 38 carried by the lower portion of the sprinkler head 12 beneath the block 26. The standard 8 is provided with a circular series of external radially projecting removable pins 39 directly below the lower end of the sprinkler head 12 and in the path of the lower end of the lever 36 when the latter is caused to rotate with the head 12 about the standard. The pins 39 are preferably removably carried by a ring or collar 40 secured on the upper end of the larger lower portion of the standard 8 as shown clearly in Figure 4, and these pins are in fixed relation to the standard so that when the lever 36 strikes one of the same, said lever 36 is caused to swing about its pivot 37 for swinging the arm 33 and consequently rocking the shaft 31 and swinging the valve plate 32.

Figure 2:
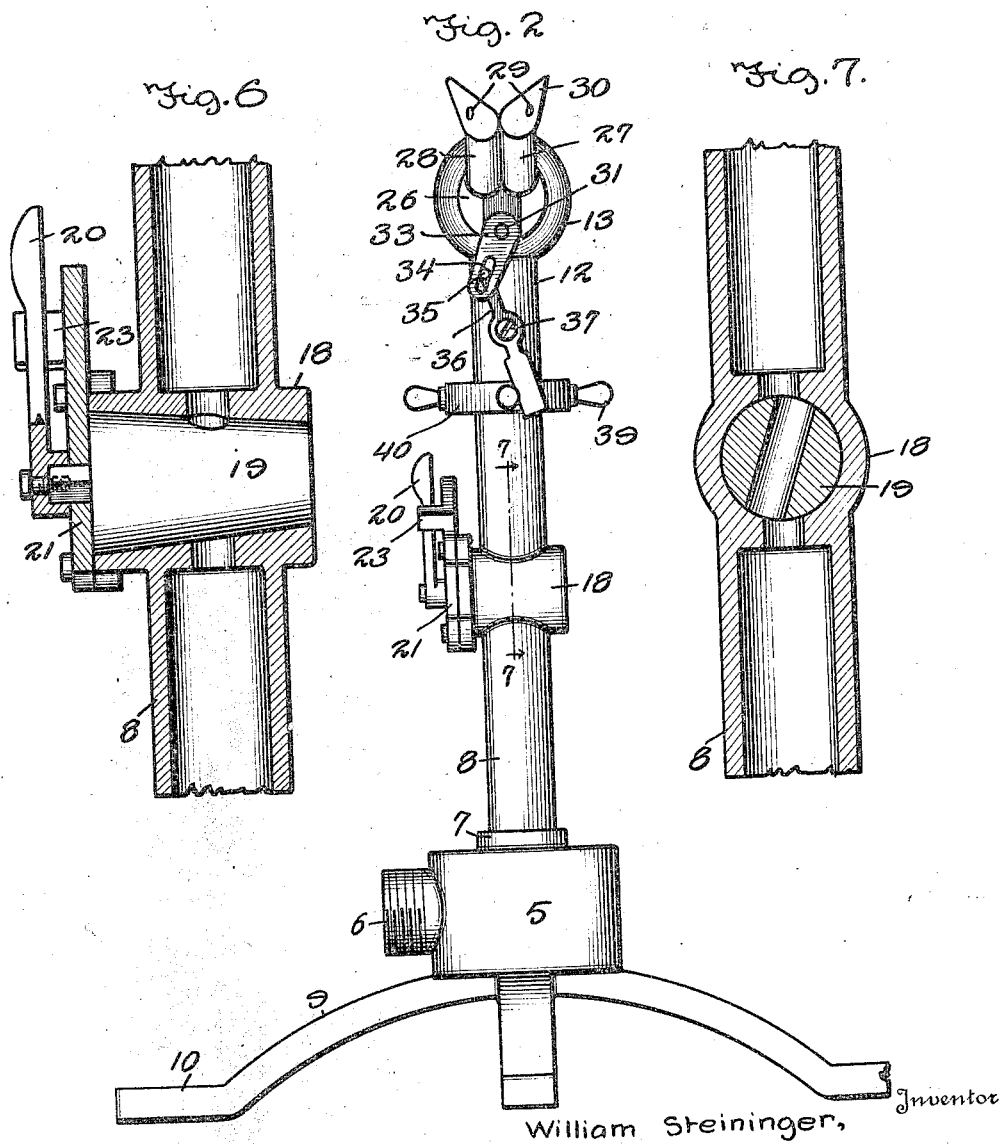
Figure 2 is a front elevational view thereof.
Figure 3:
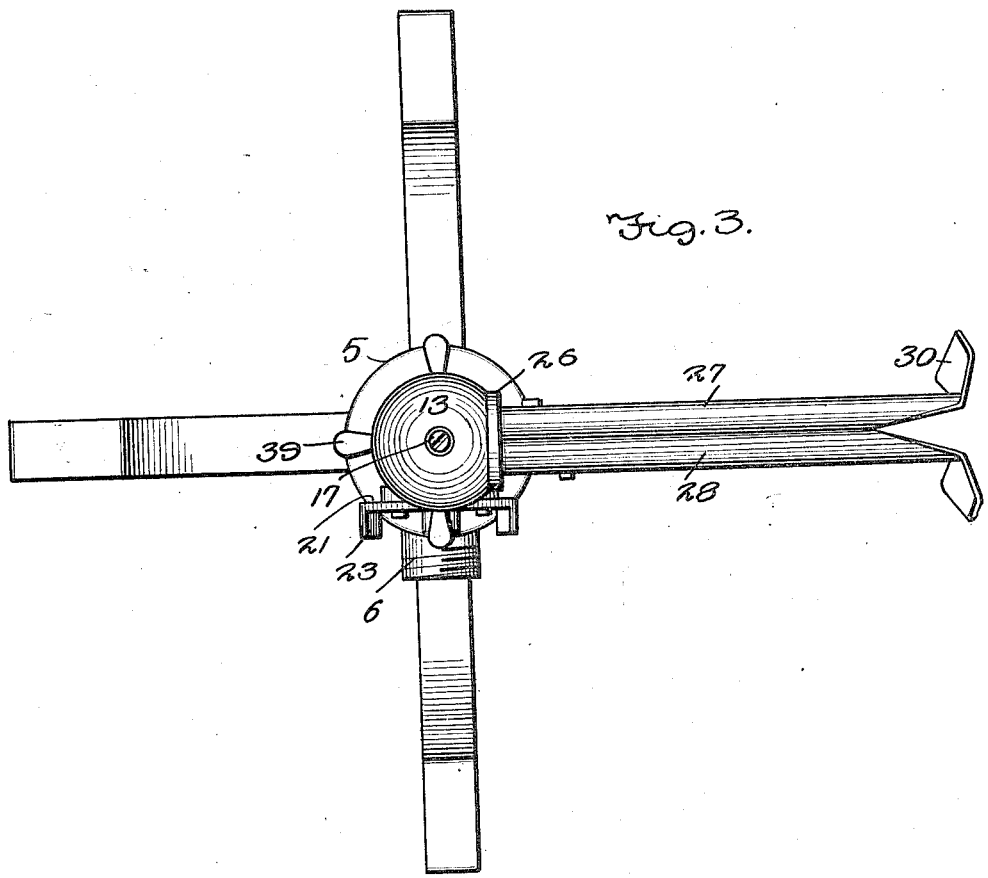
Figure 3 is a top plan view of the same.
Figure 8:
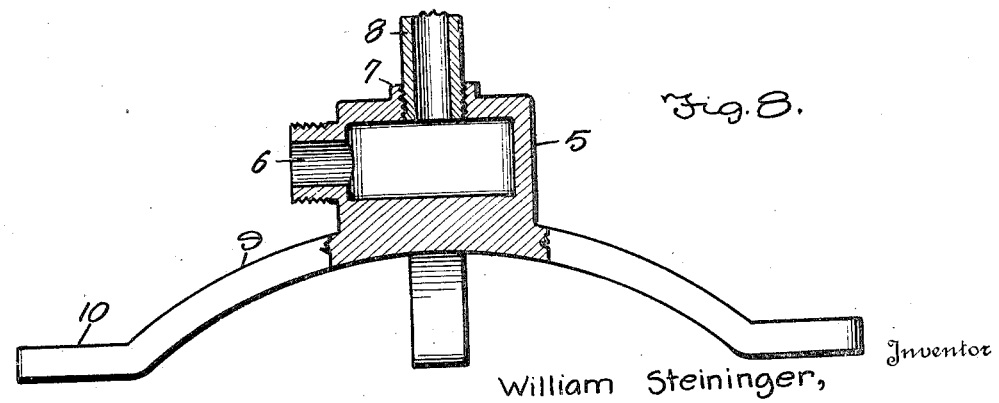
Figure 8 is a fragmentary view of the lower part of the sprinkler with the base thereof in vertical section.

Assuming that the parts are positioned as shown in the drawings, a hose will be coupled to the inlet 6 of the base 5 and the water turned on so that it will flow into the base and through the standard 8 into the larger upper end portion 13 of the sprinkler head 12 when the valve member 19 is turned to open position. With the valve plate 32 disposed as shown in Figure 5 to cover the passage 24, the water is prevented from flowing from the sprinkler head into said passage 24 and the sprinkler arm or nozzle 27, but allowed to flow through the passage 25 and sprinkler arm or nozzle 28. The discharge of water from the arm 28, by its re-action causes the sprinkler head and nozzles to swing to the right of Figure 2 until the lower end of the lever 36 engages one of the pins 39 and is swung thereby to move the valve plate 32 to a position for covering the inner end of the passage 25 and uncovering the inner end of the passage 24. As soon as this operation takes place the water is prevented from flowing into and through the arm or nozzle 28 and at the same time allowed to flow into and through the nozzle 27, whereupon the discharge of water from the arm 27, by its re-action, causes the sprinkler head to rotate in an opposite direction and to cause the nozzles to swing in a corresponding direction therewith. The sprinkler head will turn in this opposite direction until the lever 36 again strikes one of the pins 39 as shown in Figure 2, whereupon the valve plate 32 will be returned to the position shown in Figure 5 for rendering the nozzle 28 again operative and turning the sprinkler head in the first mentioned direction. This rotary oscillatory motion of the sprinkler head continues as long as the water is allowed to flow into the same, and it is apparent that the range of movement of the sprinkler head may be increased by removing as desired one or more of the pins 39. Also, by removing all of the pins 39 and setting the valve 32 to cover the passage 24, the nozzle 28 may be rendered operative to cause the head to continuously rotate in one direction, and by setting the valve 32 to cover the passage 25 with all of the pins 39 removed, the nozzle 28 may be rendered inoperative and the nozzle 27 rendered operative for causing the sprinkler head to continuously rotate in the opposite direction. The valve member 19 is provided for temporarily cutting off the flow of water to the nozzles when the position of the sprinkler upon the lawn is desired to be changed.

From the foregoing description it is believed that the construction and operation as well as the advantages of the present invention will be readily understood and appreciated by those skilled in the art.

What I claim as new is:

1. A lawn sprinkler comprising a fixed water conduit, a sprinkler head rotatably mounted thereon, the said head having an interior valve seat having a flat face and provided with spaced outlets opening through said face, a valve comprising a flat body disposed directly against the face of the seat and supported upon the seat for angular movement across the face thereof to selectively close the outlets, and coacting means upon the sprinkler head and conduit operatively connected with the valve for automatically actuating the same in the rotation of the said head.

2. A lawn sprinkler comprising a fixed water conduit, a sprinkler head rotatably mounted thereon, the said head having an interior valve seat having a flat face and provided with spaced outlets opening through said face, a valve stem rotatably mounted in the head, a valve body upon the stem, supported thereby for angular movement across the face of the seat to selectively close the outlets, and coacting means upon the sprinkler head and conduit operatively connected with the valve stem for automatically actuating the same in the rotation of the said head, the said means comprising an arm fixed with respect to the valve stem, a rocking member mounted upon the sprinkler head and having a portion coacting with the arm, and spaced abutments upon the conduit in the path of movement of another portion of the rocking member in the rotation of the sprinkler head.

3. A lawn sprinkler comprising a fixed water conduit, a sprinkler head rotatably mounted thereon, the said head having an interior flat valve seat provided with spaced outlets, a valve mounted for angular movement across the seat to selectively close the outlets, and coacting means upon the sprinkler head and conduit operatively connected with the valve for automatically actuating the same in the rotation of the said head, the said means comprising an arm fixed with respect to the valve, a rocking member mounted upon the sprinkler head and bodily movable therewith and having operative engagement with the said arm at one side of its pivot, a ring upon the conduit, and a series of abutments selectively, removably mounted upon the said ring and in the path of movement of a portion of the said rocking member below the said pivot thereof.

4. A lawn sprinkler comprising a fixed water conduit, a sprinkler head rotatably mounted upon the conduit, the head having an opening in one side, a body fitted into said opening and having a flat inner surface located interiorly of the head, the said body having outlet passages therein, sprinkler arms extending from the said outlets and having relatively oppositely presented discharges, a valve angularly adjustable across the said face of the said body member to selectively close the outlet passages and including a stem rotatable in the body member, an arm fixed upon the said stem, a trip member mounted for rocking movement upon the said sprinkler head and operatively coacting with the said arm, and spaced abutments upon the conduit for successive alternate engagement by the trip member to effect actuation of the trip member and automatic actuation of the valve in the rotation of the sprinkler head.

5. A lawn sprinkler comprising a fixed water conduit, a sprinkler head rotatably mounted upon the conduit, the head having an opening in one side, a body fitted into said opening and having a flat inner surface located interiorly of the head, the said body having outlet passages therein, sprinkler arms extending from the said outlets and having relatively oppositely presented discharges, a valve angularly adjustable across the said face of the said body member to selectively close the outlet passages and including a stem rotatable in the body member, an arm fixed upon the said stem, a trip member mounted for rocking movement upon the said sprinkler head and operatively coacting with the said arm, and spaced abutments upon the conduit for successive alternate engagement by the trip member to effect actuation of the trip member and automatic actuation of the valve in the rotation of the sprinkler head, the said abutments being arranged in a series extending circumferentially of the conduit and being selectively, bodily dismountable independently of one another.

In testimony whereof I affix my signature.

WILLIAM STEININGER.